No. 765,134. PATENTED JULY 12, 1904.
E. B. FREEMAN.
SPRAYING DEVICE.
APPLICATION FILED SEPT. 3, 1903.
NO MODEL.
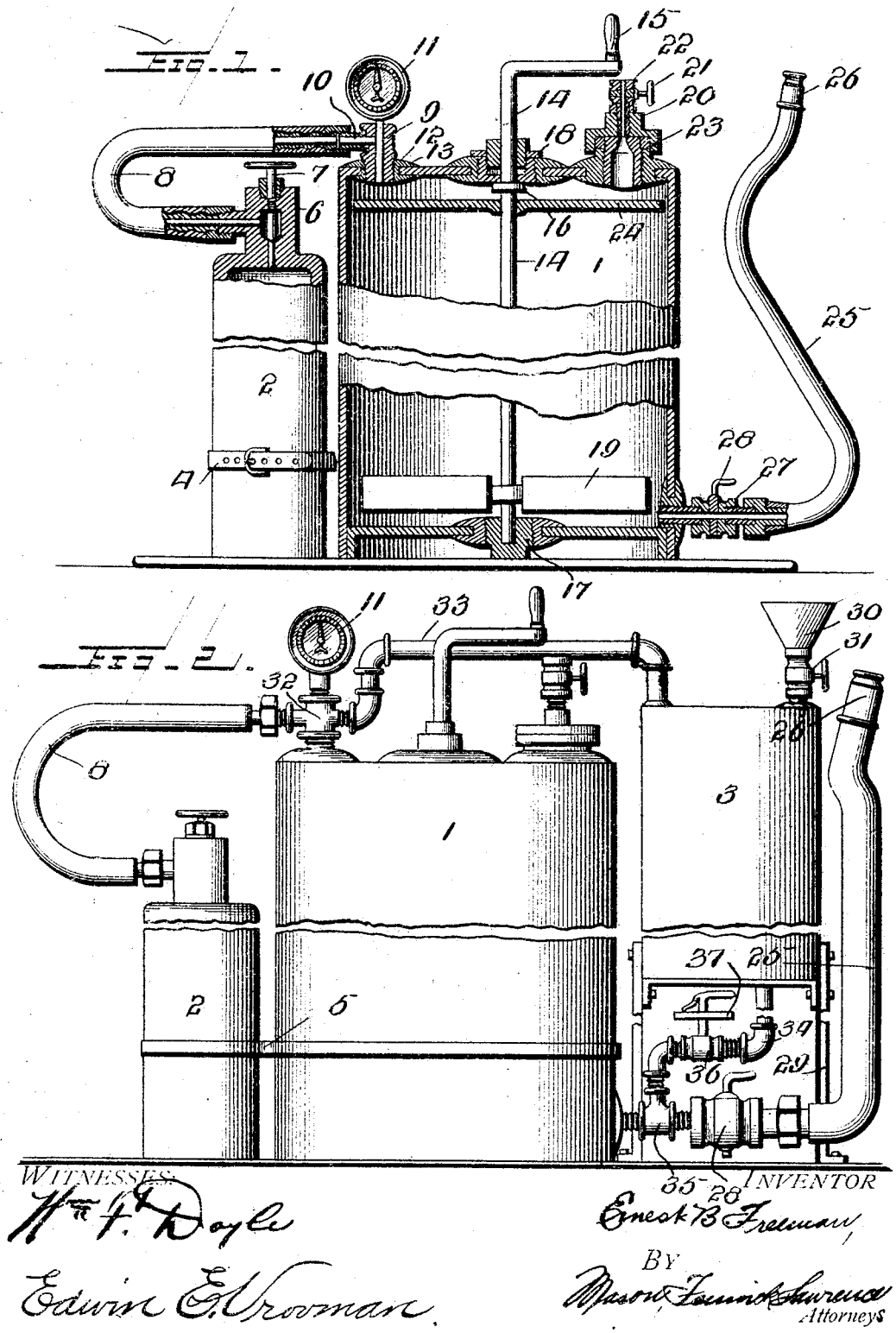

No. 765,134.

Patented July 12, 1904.

UNITED STATES PATENT OFFICE.

ERNEST B. FREEMAN, OF MIDDLEPORT, NEW YORK.

SPRAYING DEVICE.

SPECIFICATION forming part of Letters Patent No. 765,134, dated July 12, 1904.

Application filed September 3, 1903. Serial No. 171,779. (No model.)

*To all whom it may concern:*

Be it known that I, ERNEST B. FREEMAN, a citizen of the United States, residing at Middleport, in the county of Niagara and State of New York, have invented certain new and useful Improvements in Spraying Devices; and I do hereby declare the following to be a full, clear, and exact description of the invention, such as will enable others skilled in the art to which it appertains to make and use the same.

This invention relates to improvements in spraying apparatuses.

The object of the invention is to construct a device in which is employed a carbonic-gas tank for the purpose of obtaining the pressure for throwing liquid.

Another object of the invention is to construct an apparatus in which the ordinary hand-pump is not employed and to provide a machine using carbonic gas in the same tank with the liquid sprayed, but not carbonating this liquid to any great extent, as prevented by a floating piston.

Still another object is the employment of a tested hose combined with a safety-valve and a flexible connection.

Another object of the invention is to provide a liquid and also an oil-receptacle with means derived from the same common source for forcing the contents from said receptacles in a mixed condition.

With these and other objects in view the invention consists in the novel construction and arrangements of parts, as is hereinafter fully described, illustrated in the accompanying drawings, and more particularly pointed out in the claims hereto appended.

In the drawings, Figure 1 is a side elevation of the invention, partly shown in vertical section. Fig. 2 is a side elevation of the invention having assembled therewith an oil-receptacle.

Like numerals of reference designate corresponding parts throughout the figures of the drawings.

In the drawings reference-numeral 1 indicates a suitable tank or receptacle for holding chemicals to be sprayed.

2 indicates a carbonic-gas reservoir or tank.

3 indicates an oil tank or receptacle. The gas reservoir or tank 2 is secured to the tank 1 in an assembled position by means of a flexible strap 4, which is provided with a transverse or cross member extending between the said tanks 1 2 at 5. Formed upon the upper portion of the gas-tank 2 is an extension 6, in which is detachably mounted a suitable valve 7, controlling the discharge of the gas from said tank. Detachably secured to the tank 2 is a flexible pipe 8, forming a connection between said tank 2 and the tank 1. The flexible pipe 8 is detachably or removably secured to the apertured sleeve 9. To this sleeve 9 is secured an extension 10, having an aperture, and said extension 10 is adapted to enter and detachably secure the pipe 8 in connection with the tank 1. Secured to the sleeve 9 is a pressure-gage 11. The sleeve 9 is detachably secured to the tank and is mounted within a casing 12, having annular extensions 13, engaging the casing of the tank 1. Within the tank 1 is rotatably mounted an agitating-shaft 14, which is provided with a suitable handle 15. The shaft 14 is retained within the tank 1 by means of a collar or bolt 16, secured upon the periphery of the shaft 14. The lower portion of the shaft is journaled in a detachable nut 17, secured in the bottom of the tank 1. A gland 18 is detachably secured to the tank 1 and is adapted to receive the shaft 14, which is journaled therein. Upon the rotating shaft 14 are agitating-blades 19. Said blades are so arranged as to force the liquid from the bottom toward the top of the tank. An escape-valve 20 is detachably secured to the tank 1 and comprises a rotary cock or valve 21, which is mounted within a detachable sleeve 22. Said sleeve 22 is secured to an inner sleeve, which is retained in an assembled position upon the tank by means of the cap 23. Slidably mounted upon the shaft 14 is a floating piston 24.

In Fig. 1 I do not employ in the construction of the apparatus the tank 3. (Shown in Fig. 2.) It will be seen in Fig. 1 that a flexible pipe 25, provided with a spraying-nozzle 26, is detachably secured to a removable sleeve 27, mounted in a valve 28, which controls the discharge of the liquids from the tank 1.

In Fig. 2 the oil-tank 3 is mounted upon suitable legs 29. To fill the tank 3, I have provided a funnel 30, secured to a valve-controlled inlet 31. Instead of using the ordinary coupling, as shown at 9 in Fig. 1, in Fig. 2 I employ a four-way connection 32, to which is detachably secured a pipe 33. Said pipe 33 is adapted to conduct the gas contained in tank 2 to tank 3 for forcing the oil contained therein into the spraying-pipe or hose 25. This function is accomplished by means of a pipe 34, which is secured to the bottom of the tank 3, and is connected to the discharge-pipe 25 by means of a T connection 35. Interposed between the connection 35 and the bottom of the tank 3 is a controlling-valve 36, which is adapted to limit the supply of oil which is fed to the discharge-pipe. To gage the supply of the oil discharged through the pipe 34, I preferably employ a graduated index-plate 37.

In operation the chemicals are placed in the tank 1, and by means of the gas contained in the receptacle 2 and which is conducted to the tank 1, as heretofore described, the said gas comes in contact with the floating piston and has a tendency to force the same downward, and thereby compelling the liquid to pass out through the spraying-pipe 25 when the valve 28 is opened. Although I employ carbonic gas in the same tank with the liquid sprayed, the said liquids are not carbonated to any great extent, for the reason that the floating piston prevents said carbonation by the slight agitation of the liquid caused in forcing, by means of the gas, of said member 24 into contact with the liquid contained in the tank 1. Of course it is obvious that the said member 24 will more or less be retained upon the top or surface of the liquid, but will not impart any pressure thereto except in the instance of the admission of the gas from the tank. The admission of the gas from said tank is controlled by the valve 7. When it is desired to mingle with the chemicals discharged oil, such as kerosene, the tank 3 is assembled with the said gas and chemical tanks, and the gas from said tank 2 is not only discharged in the tank 1, but by means of the pipe connection 33 with the tanks 1 and 3 the gas is also discharged into the oil-receptacle. The supply of oil can be regulated by the valve-governing means 36. If it is desired to agitate the chemicals contained in the tank 1, this operation can be produced by means of rotating the shaft 14 and actuating the blades 19.

Although I have described the preferred form of my invention and have illustrated the same in the accompanying drawings, I do not limit myself thereto, for I am aware there are certain modifications and alterations that can be made which shall fairly hold within the scope of the invention.

Having thus fully described my invention, what I claim as new, and desire to secure by Letters Patent, is—

1. A spraying apparatus comprising a closed ingredient-tank, an agitating means in the lower portion of the ingredient-tank tending to force the materials upwardly therein, means for introducing a pressure-producing agent into the tank at a point above the ingredients therein, a movable float mounted upon the ingredients in the tank for preventing the mixing of the pressure-producing agent with the agitated liquids, and means for delivering the ingredients which are forced from the tank to any suitable point.

2. A spraying apparatus comprising a closed ingredient-tank, a rotating ingredient-agitating means located in the bottom of the tank, and tending to force the ingredients upwardly therein, a pressure-containing closure mounted adjacent to the tank and having a liquid-pressure-generating agent therein, means connecting the said pressure-containing tank with the ingredient-tank, a float within the tank preventing the agitated ingredients from being mixed with the incoming pressure-producing agent, and means for conducting the ingredients to be sprayed from the said tank.

3. In a spraying apparatus, a plurality of ingredient-tanks, a sealed pressure-tank, adapted to supply pressure to said tanks, a conduit communicating with said pressure-tank at one end and separately with each of said ingredient-tanks, pressure-regulating means in said conduit, a mixer in the lower portion of one of said ingredient-tanks, and conducting means connected with the discharge of said ingredient-tanks.

4. In a spraying apparatus, a plurality of sealed ingredient-tanks, a sealed pressure-tank adapted to supply pressure to said tanks, a conduit communicating with said pressure-tank at one end and by means of separate branches directly with each of said ingredient-tanks, pressure regulating and indicating means in said conduit, a mixer in the lower portion of one of said ingredient-tanks, and conducting means connected with the discharge of said ingredient-tanks.

In testimony whereof I hereunto affix my signature in presence of two witnesses.

ERNEST B. FREEMAN

Witnesses:
 A. D. LEWIS,
 F. A. LORD.